Oct. 27, 1953
O. L. GARRETSON
2,656,850
EXCESS FLOW CHECK VALVE WITH MANUAL RESET MEANS
Filed April 15, 1946
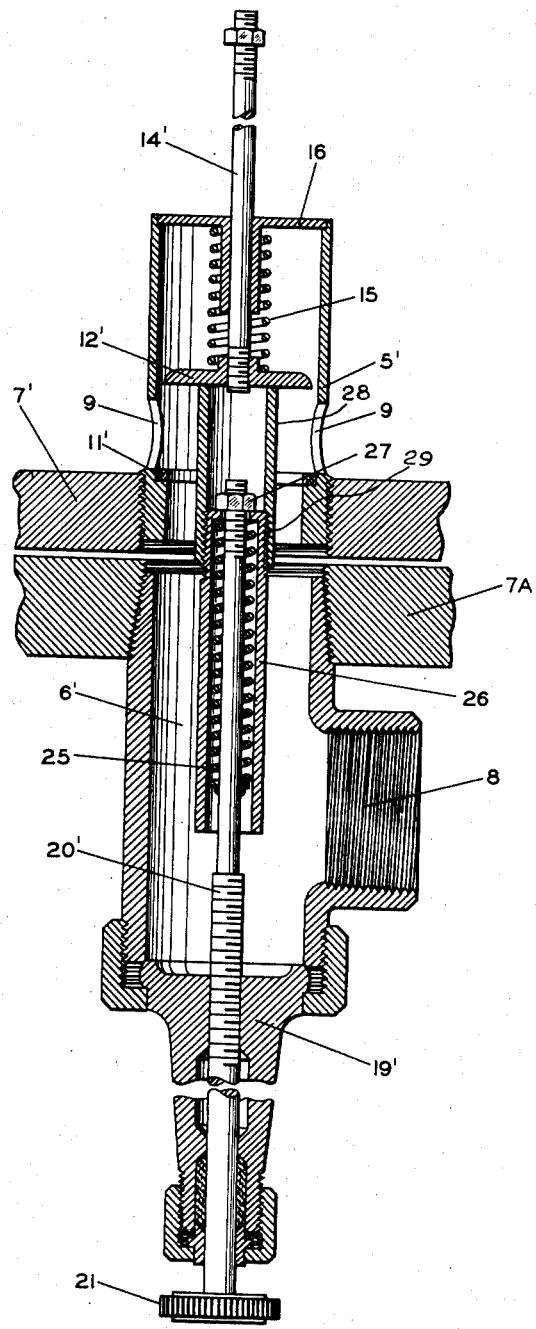
INVENTOR.
O. L. GARRETSON
BY Hudson & Young
ATTORNEYS Patented Oct. 27, 1953

2,656,850

UNITED STATES PATENT OFFICE 2,656,850

EXCESS FLOW CHECK VALVE WITH MANUAL RESET MEANS

Owen L. Garretson, Bartlesville, Okla., assignor to Phillips Petroleum Company, a corporation of Delaware Application April 15, 1946, Serial No. 662,371

3 Claims. (Cl. 137—460)

This invention relates to excess flow valves. In one particular aspect it relates to excess flow valve mechanisms having manually operable means for resetting such valves.

One preferred use to which this invention is adapted is an internal excess flow valve for liquid petroleum gas containers, but the invention is not limited to such use. It may be employed in any application to which excess flow valves are adapted.

The use of excess flow valves of conventional design on outlet lines of liquid petroleum gas containers has the great disadvantage of permitting small leaks in outlet lines between the excess flow valve, usually installed at the junction of outlet line and container, and the terminal hand valve with which such lines are conventionally closed. A partial breakage or development of a small leak in such location is not sufficient to cause an excess flow valve to close but may result in serious explosion or fire hazard and also may waste much valuable material. An excess flow valve which may be manually reset when desired is needed for use on liquid petroleum gas trucks.

It is an object of this invention to provide an automatic excess flow valve mechanism which may be manually operated to reset the valve when desired.

Another object is to provide an automatic excess flow valve mechanism which is simple, rugged, foolproof and cheap in construction, and which has the particular advantageous arrangement and combination of parts as shown.

Other objects and advantages will become apparent to those skilled in the art as this disclosure proceeds.

My invention may be better understood on reference to the accompanying drawings wherein the figure is a vertical section of a preferred embodiment thereof.

In the figure valve body 5' having a fluid conduit 6' therethrough is shown in two-piece construction inserted into a double walled containing vessel 7', 7A. Obviously the space between 7' and 7A is sealed off at some place (not shown). Valve seat 11' is disposed in conduit 6', having outlet port 8 and inlet ports 9. A moveable valve head 12' is disposed in conduit 6' and is adapted to be moved to seat on valve seat 11', thereby substantially closing conduit 6'. Valve stem 14' is attached to valve head 12' and extends slideably through end closure member 16. Resilient member 15 is adapted to be compressed when valve head 12' is raised from seat 11' and exerts pressure tending to seat head 12' on seat 11'. Any simple mechanical means for constantly exerting controlled pressure may be substituted for member 15.

A threaded rod 20' extends through threaded end member 19' into conduit 6' and is adapted to be advanced and retracted in a direction perpendicular with the plane of valve head 12' by turning hand wheel 21. Rod 20' is made sufficiently long to force head 12' from seat 11' when the rod is fully advanced. Rod 20' carries resilient member 25. Moveable housing 26 surrounds rod 20' and resilient member 25. This housing is adapted to be guided by rod 20' and to be advanced toward valve head 12' by pressure of resilient member 25 and to be forced back by pressure sufficient to compress resilient member 25. Member 27 carried by rod 20' limits the movement of housing 26 in the direction of valve head 12'. Extension member 28 may be attached to housing 26, for example, being threaded thereto by threads 29, and adapted to force valve head 12' away from valve seat 11' when rod 20' is advanced, to the position shown in the figure. Obviously, extension member 28 may be made integral with housing 26 if desired.

While 7' and 7A are shown as a double wall, obviously the valve structure of the figure may be applied to a single wall structure.

Operation

The embodiment shown in the figure is installed in a containing vessel 7', 7A and connected to an outflow pipe (not shown). With the valve head seated on valve seat 11' pressure of fluid within the containing vessel and pressure from member 15 retain valve head 12' on seat 11' against pressure transmitted from resilient member 25 via housing 26 tending to raise the valve head from the valve seat. To open the valve hand wheel 21 must be turned to advance the threaded rod 20' to raise valve head 12' slightly from seat 11'. Fluid then flows into conduit 6' and pressure therein builds up sufficiently to permit pressure from resilient member 25 transmitted via the housing 26 to raise valve head 12'. Rod 20' is then retracted slightly below the level of seat 11'.

In the open position the valve functions as an excess flow valve. Excess flow through conduit 6' reduces the back pressure on valve head 12' and permits the valve head to be forced into seating position on seat 11' by combined pressure of fluid within containing vessel 7', 7A and from member 15 against resistance of member 25. When closed the valve must be opened by manually operating hand wheel 21 to advance rod 20'. It will be noted that the closure member 16 defines a chamber together with the upper part of conduit 5' and valve head 12' when the valve is in open position, and the fluid inlet ports 9 are positioned between said chamber and the valve seat 11'. The seating face of the valve head is thus so positioned relative to the flow path of fluid through the valve that, when there is an excessive flow, there is a pressure reduction across said seating face producing a pressure differential tending to cause seating of the valve. Also, a contributing force, tending to close the valve, is produced by the viscous drag of the fluid flowing from inlets 9 to outlet 8 against housing 25. This force tends to move housing 25 downwardly and thus reduce the upward pressure of the housing against the valve head.

While I have shown in the drawing an illustrative embodiment of my invention, obviously various modifications may be made in the same without departing from the spirit or substance of the invention which is defined in scope only by the following claims.

Having described my invention, I claim:

1. An excess flow valve comprising, in combination; a valve body having a fluid conduit therethrough; a valve seat disposed in said conduit; a moveable valve head disposed in said conduit adapted to be moved to seat on said valve seat and thereby close said conduit; the edges of said valve head being closely spaced to said conduit and defining a restricted passage therewith, means closing said conduit at the end thereof remote from said valve seat, thereby defining a chamber together with the conduit and valve head when the valve is in open position, a fluid inlet positioned between said chamber and said valve seat, the seating face of the valve head being so positioned relative to the flow path that, upon excess flow, the resulting reduction in pressure will act upon said seating face to produce a pressure differential tending to cause closure of the valve, a valve stem attached to said valve head and slideably extending through said body; a first spring disposed within said chamber adapted to exert pressure on said valve head to move said valve head to seat on said valve seat; and means for moving said valve head from said valve seat thereby opening said conduit comprising, in combination, a threaded rod extending through said body adapted to be advanced and retracted by turning; a housing slideable with respect to said rod and engageable with said valve head; a second spring within said housing having one end thereof secured to said rod and the other end thereof secured to said housing so as to urge said housing into engagement with the valve head and open said valve, said valve head being moved from open position to closed position when the combined force due to said first spring and to flow past said open valve exceeds the opening force of the second spring.

2. In an excess flow valve, in combination; a valve body having a fluid conduit therethrough; a valve seat disposed in said conduit; a moveable valve head disposed in said conduit adapted to be moved to seat on said valve seat and thereby close said conduit; the edges of said valve head being closely spaced to said conduit and defining a restricted passage therewith, means closing said conduit at the end thereof remote from said valve seat, thereby defining a chamber together with the conduit and valve head when the valve is in open position, a fluid inlet positioned between said chamber and said valve seat; the seating face of the valve head being so positioned relative to the flow path that, upon excess flow, the resulting reduction in pressure will act upon said seating face to produce a pressure differential tending to cause closure of the valve, mechanical means adapted to exert pressure on said valve head tending to move the same to seat on said valve seat; and manually operable means for moving said valve head from said valve seat comprising, in combination, a threaded rod disposed in said conduit adapted to be advanced and retracted by turning, a rigid member slideably mounted with respect to said rod and engageable with said valve head, biasing means including a spring having one end thereof connected to said rigid member and the other end thereof connected to said rod to urge said rigid member into engagement with the valve head and open the valve, said valve being moved from open position to closed position when the combined force due to said mechanical means and to flow past said open valve exceeds the opening force of said biasing means.

3. An excess flow valve mechanism comprising, in combination; a body having a fluid conduit therethrough; a valve seat disposed in said conduit; a moveable valve head disposed in said conduit having its edges closely spaced to the walls of said conduit and defining a restricted passage therewith, said moveable valve head being adapted to seat on said valve seat and thereby close said conduit; means closing said conduit at the end thereof remote from said valve seat, thereby defining a chamber together with the conduit and valve head when the valve is in open position, a fluid inlet positioned between said chamber and said valve seat, the seating face of the valve head being so positioned relative to the flow path that, upon excess flow, the resulting reduction in pressure will act upon said seating face to produce a pressure differential tending to cause closure of the valve, resilient means for exerting pressure on said valve head tending to move the same to seat on said valve seat; and manually operable means comprising, in combination, a rod disposed in said conduit adapted to be advanced and retracted, a housing slideable with respect to said rod and adapted to engage said valve head, a resilient member having one end thereof connected to said rod and the other end thereof connected to said housing so as to urge said housing into engagement with the valve head and thereby open the valve, said valve being moved from an open position to a closed position when the combined force due to said resilient means and to flow past said open valve exceeds the opening force of said resilient member.

OWEN L. GARRETSON.

References Cited in the file of this patent

UNITED STATES PATENTS

| Number | Name | Date |
| --- | --- | --- |
| 701,754 | Moran | June 3, 1902 |
| 809,859 | Stulp | Jan. 9, 1906 |
| 862,752 | Pennell | Aug. 6, 1907 |
| 988,175 | Cumley | Mar. 28, 1911 |
| 1,101,933 | Hough | June 30, 1914 |
| 2,081,938 | Leonard | June 1, 1937 |
| 2,098,583 | Kleinsmith | Nov. 9, 1937 |
| 2,356,410 | Krugler | Aug. 22, 1944 |
| 2,472,694 | Chouings | June 7, 1949 |

FOREIGN PATENTS

| Number | Country | Date |
| --- | --- | --- |
| 22,796 | Switzerland | of 1901 |
| 130,556 | Great Britain | of 1919 |